US009930448B1

(12) United States Patent
Chen et al.

(10) Patent No.: US 9,930,448 B1
(45) Date of Patent: Mar. 27, 2018

(54) CONCENTRIC CIRCULAR DIFFERENTIAL MICROPHONE ARRAYS AND ASSOCIATED BEAMFORMING

(71) Applicant: Northwestern Polytechnical University, Xi'an, Shaanxi (CN)

(72) Inventors: Jingdong Chen, Xi'an (CN); Gongping Huang, Xi'an (CN); Jacob Benesty, Montreal (CA)

(73) Assignee: NORTHWESTERN POLYTECHNICAL UNIVERSITY, Xi'an, Shaanxi (CN)

( * ) Notice: Subject to any disclaimer, the term of this patent is extended or adjusted under 35 U.S.C. 154(b) by 0 days.

(21) Appl. No.: 15/347,482

(22) Filed: Nov. 9, 2016

(51) Int. Cl.
*H04R 3/00* (2006.01)
*H04R 1/40* (2006.01)
*G01S 3/80* (2006.01)

(52) U.S. Cl.
CPC ............ *H04R 3/005* (2013.01); *H04R 1/406* (2013.01); *H04R 2201/401* (2013.01); *H04R 2430/21* (2013.01)

(58) Field of Classification Search
CPC .. H04R 3/005; H04R 1/406; H04R 2201/401; H04R 2201/405; H04R 2430/23; H04R 2430/20; H04R 5/027; H04R 2410/01; H04R 2201/40; H04R 2420/07; H04R 29/00; H04R 29/005; H04R 1/04; H04S 2400/15; H04S 7/301; G10L 2021/02166
USPC ........ 381/92, 310, 122, 56, 26, 58; 367/129; 379/202.01
See application file for complete search history.

(56) References Cited

U.S. PATENT DOCUMENTS

2011/0194719 A1* 8/2011 Frater .................... H04R 27/00 381/332
2015/0163577 A1* 6/2015 Benesty ................ H04R 1/406 381/92

* cited by examiner

*Primary Examiner* — Norman Yu
(74) *Attorney, Agent, or Firm* — Lowenstein Sandler LLP

(57) ABSTRACT

A differential microphone array includes a plurality of microphones situated on a substantially planar platform, the plurality of microphones including a total number (M) of microphones and at least two subsets of the plurality of microphones situated along at least two substantially concentric ellipses with respect to a center, and a processing device, communicatively coupled to the plurality of microphones, to receive a plurality of electronic signals generated by the plurality of microphones responsive to a sound source and execute a minimum-norm beamformer to calculate an estimate of the sound source based on the plurality of electronic signals, in which the minimum-norm beamformer has a differential order (N), and wherein M>N+1.

20 Claims, 7 Drawing Sheets

200

CONCENTRIC CIRCULAR DIFFERENTIAL MICROPHONE ARRAYS AND ASSOCIATED BEAMFORMING

TECHNICAL FIELD

This disclosure relates to microphone arrays and, in particular, to a concentric circular differential microphone array (CCDMA) associated with a robust beamformer.

BACKGROUND

Beamformers (or spatial filters) are used in sensor arrays (e.g., microphone arrays) for directional signal transmission or reception. A sensor array can be a linear array where the sensors are arranged approximately along a linear platform (such as a straight line) or a circular array where the sensors are arranged approximately along a circular platform (such as a circular line). Each sensor in the sensor array may capture a version of a signal originating from a source. Each version of the signal may represent the signal captured at a particular incident angle with respect to the corresponding sensor at a particular time. The time may be recorded as a time delay with a reference point such as, for example, a first sensor in the sensor array. The incident angle and the time delay are determined according to the geometry of the array sensor. Additionally, the captured versions of the signal may also include noise components. An array of analog-to-digital converters (ADCs) may convert the captured signals into a digital format (referred to as a digital signal). A processing device may implement a beamformer to calculate certain attributes of the signal source based on the digital signals.

BRIEF DESCRIPTION OF THE DRAWINGS

The present disclosure is illustrated by way of example, and not by way of limitation, in the figures of the accompanying drawings.

DETAILED DESCRIPTION

Figure 1:
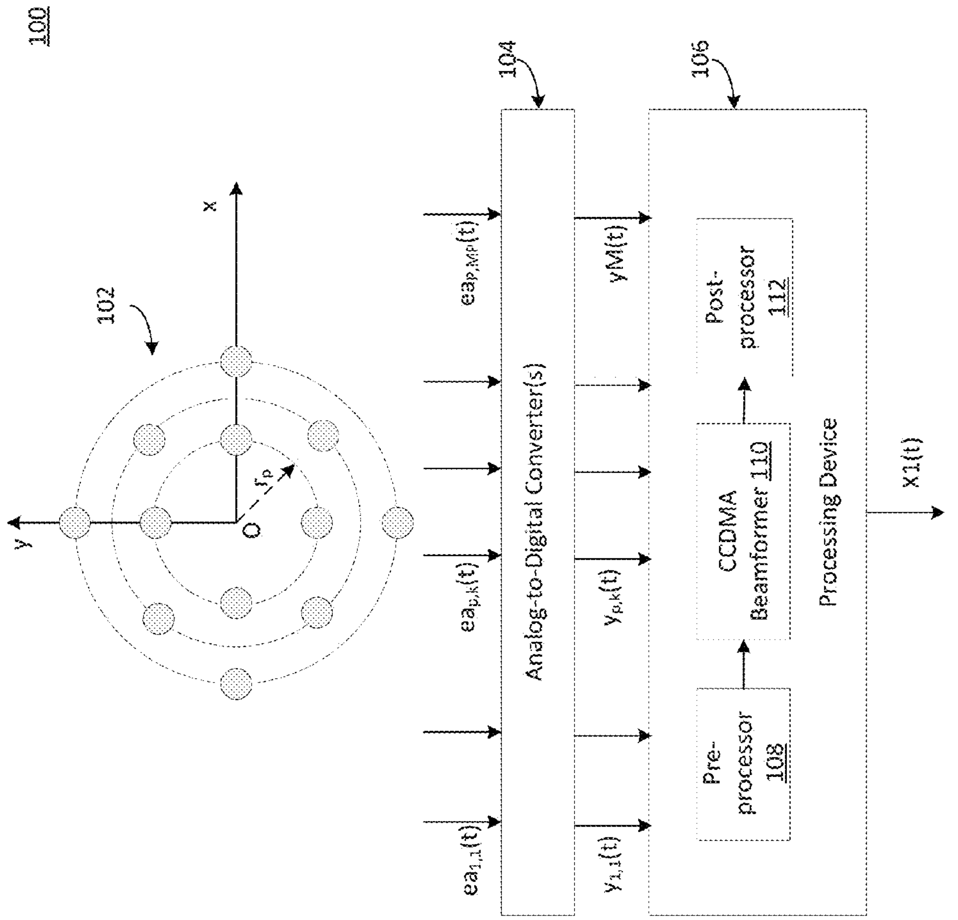
FIG. 1 illustrates a concentric circular differential microphone array (CCDMA) system according to an implementation of the present disclosure.

Each sensor in a sensor array may receive a signal emitted from a source at a particular incident angle with a particular time delay to a reference (e.g., a reference sensor). The sensor can be a suitable type of sensors such as, for example, microphone sensors that capture sound signals. A microphone sensor may include a sensing element (e.g., a membrane) responsive to the acoustic pressure generated by sound waves arriving at the sensing element, and an electronic circuit to convert the acoustic pressures received by the sensing element into electronic currents. The microphone sensor can output electronic signals (or analog signals) to downstream processing devices for further processing. Each microphone sensor in a microphone array may receive a respective version of a sound signal emitted from a sound source at a distance from the microphone array. The microphone array may include a number of microphone sensors to capture the sound signals (e.g., speech signals) and converting the sound signals into electronic signals. The electronic signals may be converted by analog-to-digital converters (ADCs) into digital signals which may be further processed by a processing device (e.g., a digital signal processor (DSP)). Compared with a single microphone, the sound signals received at microphone arrays include redundancy that may be explored to calculate an estimate of the sound source to achieve certain objectives such as, for example, noise reduction/speech enhancement, sound source separation, de-reverberation, spatial sound recording, and source localization and tracking. The processed digital signals may be packaged for transmission over communication channels or converted back to analog signals using a digital-to-analog converter (DAC).

The microphone array can be communicatively coupled to a processing device (e.g., a digital signal processor (DSP) or a central processing unit (CPU)) that includes logic circuits programmed to implement a beamformer for calculating an estimate of the sound source. The sound signal received at any microphone sensor in the microphone array may include a noise component and a delayed component with respect to the sound signal received at a reference microphone sensor (e.g., a first microphone sensor in the microphone array). A beamformer is a spatial filter that uses the multiple versions of the sound signal received at the microphone array to identify the sound source according to certain optimization rules.

The sound signal emitted from a sound source can be broadband signals such as, for example, speech and audio signals, typically in the frequency range from 20 Hz to 20 KHz. Some implementations of the beamformers are not effective in dealing with noise components at low frequencies because the beamwidths (i.e., the widths of the main lobes in the frequency domain) associated with the beamformers are inversely proportional to the frequency. To counter the non-uniform frequency response of beamformers, differential microphone arrays (DMAs) have been used to achieve frequency-invariant beam patterns and high directivity factors (DFs), where the DF describes sound intensity with respect to direction angles. DMAs may contain an array of microphone sensors that are responsive to the spatial derivatives of the acoustic pressure field. For example, the outputs of a number of geographically arranged omnidirectional sensors may be combined together to measure the differentials of the acoustic pressure fields among microphone sensors. Compared to additive microphone arrays, DMAs allow for small inter-sensor distance, and may be manufactured in a compact manner.

DMAs can measure the derivatives (at different orders) of the acoustic fields received by the microphones. For example, a first-order DMA, formed using the difference between a pair of adjacent microphones, may measure the first-order derivative of the acoustic pressure fields, and the second-order DMA, formed using the difference between a pair of adjacent first-order DMAs, may measure the second-order derivatives of acoustic pressure field, where the first-order DMA includes at least two microphones, and the second-order DMA includes at least three microphones. Thus, an N-th order DMA may measure the N-th order derivatives of the acoustic pressure fields, where the N-th order DMA includes at least N+1 microphones. The N-th order is referred to as the differential order of the DMA. The directivity factor of a DMA may increase with the order of the DMA.

The microphone sensors in a DMA can be arranged either on a linear platform or on a curved platform (referred to as linear DMA). The curved platform may can be an elliptic platform and in particular, a circular platform (referred to as circular DMA). Compared to linear DMA (LDMA), the circular DMA (CDMA) can be steered easily and have a substantially identical performance for sound signals from different directions. This is useful in situations such as, for example, when the sound comes from directions other than along a straight line (or the endfire direction).

CDMAs may include omnidirectional microphones placed on a planar surface substantially along the trace of a circle. An omnidirectional microphone is a microphone that picks up sound with equal gain from all sides or directions with respect to the microphone. CDMAs, however, may amplify white noise associated with the captured signals. The white noise may come from the device noise. Minimum-norm filters have been used to improve the white noise gain (WNG) by increasing the number of microphones used in a microphone array given the DMA order. Although a large number of microphones deployed in a microphone array may improve the WNG, the large number of microphones associated with the minimum-norm filters may result in a larger array aperture, and consequently, more nulls in lower frequency bands. A null is created when the responses from different frequency bands, when combined, cancel each other. The nulls may produce undesirable dead regions in the minimum-norm beamformers associated with CDMAs.

Implementations of the present disclosure provide a technical solution that may substantially enhance the robustness of a beamformer and reduce nulls (deep valleys) of the directivity factor in the frequency band of interest. In contrast to the CDMAs where a single ring of microphones are used to form the microphone array, implementations of the present disclosure employ concentric circular microphone arrays (CCDMAs) to capture sound signals and provide for a robust beamformer, associated with the CCDMAs, that may improve the WNG and eliminate the nulls. A CCDMA is a microphone array that includes more than one CDMA that share a common central reference point and have different radii.

FIG. 1 illustrates a concentric circular differential microphone array (CCDMA) system 100 according to an implementation of the present disclosure. As shown in FIG. 1, system 100 may include a CCDMA 102, an analog-to-digital converter (ADC) 104, and a processing device 106. CCDMA 102 may include multiple, concentric CDMAs that are arranged on a common plenary platform. Each one of the CDMAs may include one or more of microphones placed substantially along a circle with respect to a common central point (O). Thus, CCDMA 102 may include concentric rings of microphones For example, as shown in FIG. 1, CCDMA 102 may include P (P=3) rings, wherein the p-th (p=1, 2, 3) ring may have a radius of $r_p$ and include $M_p$ omnidirectional microphones.

The microphone sensors in microphone array 102 may receive acoustic signals originated from a sound source from a certain distance. In one implementation, the acoustic signal may include a first component from a sound source (s(t)) and a second noise component (v(t)) (e.g., ambient noise), wherein t is the time. Due to the spatial distance between microphone sensors, each microphone sensor may receive a different version of the sound signal (e.g., with different amount of delays with respect to a reference point such as, for example, a designated microphone sensor in CCDMA 102) in addition to the noise component.

Figure 2:
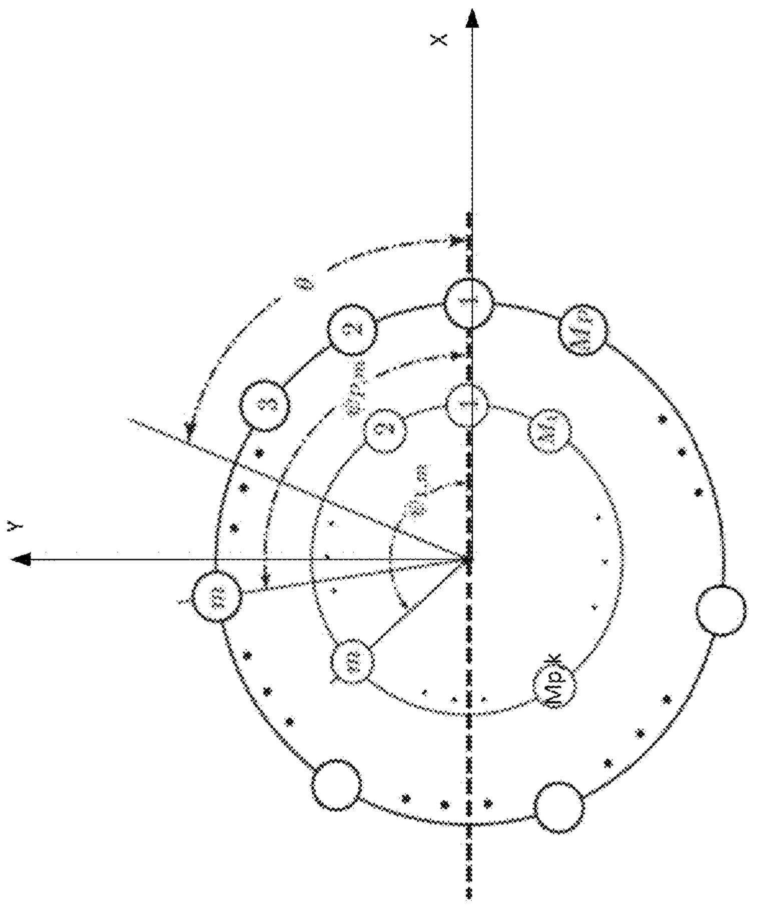
FIG. 2 shows a detailed arrangement of a uniform concentric circular array (UCCA) according to an implementation of the present disclosure.

FIG. 2 illustrates a detailed arrangement of a uniform concentric circular array (UCCA) 200 according to an implementation of the present disclosure. UCCA 200 may include a P rings of microphones, placed on the x-y plane, where the $p^{th}$ (p=1, 2, . . . , P) ring, with a radius of $r_p$, including $M_p$ microphones (e.g., omnidirectional microphones). For the $p^{th}$ ring, the Mp microphones are uniformly arranged along the circle of the $p^{th}$ ring, or the microphones on the $p^{th}$ ring are separate from their neighboring microphones at a substantially equal amount of angular distance. For the simplicity and convenience of discussion, it is assumed that the center of the UCCA 200 coincides with the origin of the two-dimensional Cartesian coordinate system, and that azimuthal angles are measured anti-clockwise from the x axis, and the first microphone (#1) of the array is placed on the x axis as shown in FIG. 2. FIG. 2 is for illustration purpose. Implementations of the present disclosure are not limited to the arrangement as shown in FIG. 2. For example, the first microphone of different rings within the UCCA 200 may be placed at different angles with respect to the x-axis.

Thus, the coordinates of the $m^{th}$ microphone in the $p^{th}$ ring can be represented as $$r_{p,m}=(r_p \cos \psi_{p,m}, r_p \sin \psi_{p,m}),$$

where p=1, 2, . . . , P, m=1, 2, . . . , Mp, and $$\psi_{p,m} = \frac{2\pi(m-1)}{M_p}$$

is the angular position of the $m^{th}$ microphone on the $p^{th}$ ring, where the Mp microphones on the $p^{th}$ ring are placed uniformly along the $p^{th}$ circle. Further, it is assumed that a source signal (plane wave) located in the far-field impinges on the UCCA 200 from the direction (azimuth angle) θ, at the speed of sound (C) in the air, e.g., C=340 m/s.

UCCA 200 may be associated with a steering vector that characterizes UCCA 200. The steering vector may represent the relative phase shifts for the incident far-field waveform across the microphones in UCCA 200. Thus, the steering vector is the response of UCCA 200 to an impulse input. For UCCA 200 that have P rings where each ring has a number ($M_p$) of microphones, the length of a steering vector is $M=\Sigma_{p=1}^{P} M_p$ or the total number of microphones in UCCA 200. The steering vector can be defined as $$d(\omega,\theta)=[d_1^T(\omega,\theta) d_2^T(\omega,\theta) \dots d_P^T(\omega,\theta)]^T,$$

where $$d_p(\omega,\theta) = \left[ e^{j\varpi_p \cos(\theta-\psi_{p,1})} \quad e^{j\varpi_p \cos(\theta-\psi_{p,2})} \quad \dots \quad e^{j\varpi_p \cos(\theta-\psi_{p,M_p})} \right]^T$$

is the $p^{th}$ ring's steering vector, the superscript T is the transpose operator, j is the imaginary unit with $j^2=1$, and $$\overline{\omega_p} = \frac{\omega r_p}{c},$$

where $\omega=2\pi f$ is the angular frequency, $f>0$ is the temporal frequency, and $r_p$ is the radius for the $r^{th}$ ring.

For convenience, as shown in FIG. 2, microphones in different rings may be labeled as $m_{p,k}$, where p=1, 2, . . . P represent the index of the ring on which the microphone is located, and k=1, . . . , $M_p$ represent the index for a microphone on the $p^{th}$ ring. Thus, microphone $m_{p,k}$ denotes the $k^{th}$ microphone on the $p^{th}$ ring. Microphones $m_{p,k}$, where k=1, . . . , $M_p$ and p=1, 2, . . . P, may respectively receive an acoustic signal $a_{p,k}(t)$ originated from a sound source, where t is the time, k=1, . . . , $M_p$, and p=1, 2, . . . P.

Referring to FIG. 1, each microphone may receive a version of an acoustic signal $a_{p,k}(t)$ that may include a delayed copy of the sound source represented as $s(t+d_{p,k})$ and a noise component represented as $v_{p,k}(t)$, wherein t is the time, k=1, . . . , $M_p$, p=1, 2, . . . P, $d_{p,k}$ is the time delay for the acoustic signal received at microphone $m_{p,k}$ to a reference microphone (e.g., $m_{1,1}$), and $v_{p,k}(t)$ represents the noise component at microphone $m_{p,k}$. The electronic circuit of microphone $m_{p,k}$ of CCDMA 102 may convert $a_{p,k}(t)$ into electronic signals $ea_{p,k}(t)$ that may be fed into the ADC 104, wherein k=1, . . . , $M_p$, p=1, 2, . . . P. In one implementation, the ADC 104 may further convert the electronic signals $ea_{p,k}(t)$ into digital signals $y_{p,k}(t)$. The analog to digital conversion may include quantize the input $ea_{p,k}(t)$ into discrete values $y_{p,k}(t)$.

In one implementation, the processing device 106 may include an input interface (not shown) to receive the digital signals $y_{p,k}(t)$, and as shown in FIG. 1, the processing device may be programmed to identify the sound source by performing a CCDMA beamformer 110. To perform CCDMA beamformer 110, in one implementation, the processing device 106 may implement a pre-processor 108 that may further process the digital signal $y_{p,k}(t)$ for CCDMA beamformer 110. The pre-processor 108 may include hardware circuits and software programs to convert the digital signals $y_{p,k}(t)$ into frequency domain representations using such as, for example, short-time Fourier transforms (STFT) or any suitable type of frequency transforms. The STFT may calculate the Fourier transform of its input signal over a series of time frames. Thus, the digital signals $y_{p,k}(t)$ may be processed over the series of time frames.

In one implementation, the pre-processing module 108 may perform STFT on the input $y_{p,k}(t)$ associated with microphone $m_{p,k}$ of CCDMA 102 and calculate the corresponding frequency domain representation $Y_{p,k}(\omega)$, wherein $\omega$ ($\omega=2\pi f$) represents the angular frequency domain, k=1, . . . , $M_p$, p=1, 2, . . . P. In one implementation, CCDMA beamformer 110 may receive frequency representations $Y_{p,k}(\omega)$ of the input signals $y_{p,k}(t)$ and calculate an estimate $Z(\omega)$ in the frequency domain for the sound source (s(t)). In one implementation, the frequency domain may be divided into a number (L) of frequency sub-bands, and the CCDMA beamformer 110 may calculate the estimate $Z(\omega)$ for each of the frequency sub-bands.

The processing device 106 may also include a post-processor 112 that may convert the estimate $Z(\omega)$ for each of the frequency sub-bands back into the time domain to provide the estimate sound source represented as $X_1(t)$. The estimated sound source $X_1(t)$ may be determined with respect to the source signal received at a reference microphone (e.g., microphone $m_{1,1}$) in CCDMA 102.

Implementations of the present disclosure may include different types of CCDMA beamformers that can calculate the estimated sound source $X_1(t)$ using the acoustic signals captured by CCDMA 102. The performance of the different types of beamformers may be measured in terms of signal-to-noise ratio (SNR) gain and a directivity factor (DF) measurement. The SNR gain is defined as the signal-to-noise ratio at the output (oSNR) of CCDMA 102 compared to the signal-to-noise ratio at the input (iSNR) of CCDMA 102. When each of microphones $m_{p,k}$ is associated with white noise including substantially identical temporal and spatial statistical characteristics (e.g., substantially the same variance), the SNR gain is referred to as the white noise gain (WNG). This white noise model may represent the noise generated by the hardware elements in the microphone itself. Environmental noise (e.g., ambient noise) may be represented by a diffuse noise model. In this scenario, the coherence between the noise at a first microphone and the noise at a second microphone is a function of the distance between these two microphones. The SNR gain for the diffuse noise model is referred to as the directivity factor (DF) associated with CCDMA 102. Additionally, CCDMA 102 may be associated with a beampattern (or directivity pattern) that reflects the sensitivity of the beamformer to a plane wave impinging on CCDMA 102 from a certain angular direction θ. The beampattern for a plane wave impinging from an angle θ for a beamformer represented by a filter $\underline{h}(\omega)$ associated with CCDMA 102 can be defined as $$B[\underline{h}(\omega), \theta] = \underline{h}^H(\omega)\underline{d}(w) = \sum_{p=1}^{P}\sum_{m=1}^{M_p} H^*_{p,m}(\omega)e^{j\overline{\omega}_p\cos(\theta-\psi_{p,m})}$$

where $\underline{h}(\omega)=[h_1^T(\omega)\ h_2^T(\omega)\ \ldots\ h_P^T(\omega)]^T$ is the global filter for the beamformer associated with CCDMA 102, and the superscript H represents the conjugate-transpose operator, and $h_p(\omega)=[H_1(\omega)\ H_1(\omega)\ \ldots\ H_{M_p}(\omega)]^T$ is the spatial filter of length $M_p$ for the $p^{th}$ ring.

The beampattern for an N-th order CCDMA may be further simplified and approximated as follows:

$$B_N[\underline{h}(\omega), \theta] = \sum_{n=0}^{N} b_{N,n}\cos(n\theta),$$

where $$b_{N,n} = 2\sum_{p=1}^{P} J_n'^*(\overline{\omega}_p)\sum_{m=1}^{M_p}\cos(n\psi_{p,m})H'_{p,m}(\omega),$$

where the exponential function of $e^{j\overline{\omega}_p\cos(\theta-\psi_{p,m})}$ is approximated by a Jacobi-Anger ($J'^*_n$) expansion of order N.

When the number of rings P=1, the CCDMA 102 is degenerated into a CDMA that has one ring of microphones. The beampattern for the CDMA is $$b_{N,n}=2J'^*_n(\overline{\omega})\Sigma_{m=1}^{M}\cos(n\psi_m)H'_m(\omega).$$

The rank (N) of the beamformer associated with the number (M) of microphones employed in the CDMA. In some implementations, M=N+1. The beamformers that meet the condition of M=N+1, however, suffer white noise amplification and significant SNR gain degradation at some frequency sub-bands. In some implementations, more microphones are employed to add redundancies and counter the issues of white noise gain and the deteriorating SNR gain. In these implementations, the number (M) of microphone is larger than the beamformer rank plus one, or M>N+1. When M>N+1, the resulting beamformer can be a minimum norm filter that may have improved WNG when compared to those beamformers having M=N+1. Although increasing the number of microphones employed in the CDMA to more than the rank plus one helps improve the WNG, the larger number of microphones may also increase the microphone array aperture (i.e., the radius) of the CDMA. The larger array aperture may introduce nulls at some frequency sub-bands and cause significant SNR degradation at these frequency sub-bands.

Implementations of the present disclosure employ concentric circular differential microphone arrays (CCDMAs) and correspondingly, a robust beamformer to improve the WNG and prevent the degradation of SNG. Implementations of the present disclosure allow the flexibility to use more microphones to improve the performance of the CCDMA. When the same total number of microphones is used, the CCDMA of the present disclosure performs much better than CDMA in terms of the WNG and the SNR gain. Since the cost and size of a microphone array is proportionally related to the number of microphones (and correspondingly, the ADCs) used, the CCDMA of the present disclosure can improve the beamformer performance without incurring additional cost or bulk size.

In one implementation of the present disclosure, the CCDMA may include a number (P>1) of rings of microphones, and each ring ($p^{th}$ ring) may include a number ($M_p$) of microphones arranged substantially in a circle of radius ($r_p$). The total number of microphone can be calculated as the sum of microphones in different rings, i.e., $M=\Sigma_{p=1}^{P} M_p$. The number of microphones in different rings may vary, and the microphones in different rings may be arranged either uniformly or non-uniformly as long as they are placed substantially along a circle.

In one implementation, the CCDMA may be a uniform concentric circular array (UCCA) of microphones. The UCCA includes more than one ring of microphones, where each one of the rings includes a same number of microphones and the microphones in each ring are aligned and placed at a uniform angular distance. For example, a nine-microphone UCCA may have three rings, each ring including three microphones arranged at 60 degree apart. The UCCA may include a total number (M) of microphones that is larger than the rank (N) of the beamformer plus one. In one implementation, the minimum norm beamformer h(ω) may be designed as: $\min_{h'(\omega)} h'^{H}(\omega)h'(\omega)$, subject to the constraint of $\Psi(\omega)h'(\omega)=b_{N+1}$, where $b_{N+1}$ is the desirable beampattern, $\Psi(\omega)=[\Psi_1(\omega)\ \Psi_2(\omega)\ \ldots\ \Psi_{P1}(\omega)]$ is a matrix of size (N+1) by $\underline{M}$ (where $\underline{M}=\Sigma_{p=1}^{P} M_p$), $$\Psi_1(\omega) = \begin{bmatrix} J_0'^{*}(\overline{\omega}_p)\gamma_{p,0}^T \\ J_1'^{*}(\overline{\omega}_p)\gamma_{p,1}^T \\ \vdots \\ J_N'^{*}(\overline{\omega}_p)\gamma_{p,N}^T \end{bmatrix}$$

is a matrix of size N+1 by $M_p$, with $\gamma_{p,n}=[1\ \cos(n\psi_{p,2})\ \ldots\ \cos n\psi_{p,M_p}]^T$, n=0, 1, 2, . . . , N, p=1, 2, . . . , P, and $\underline{h}'(\omega)=[h'^{T}_1(\omega)\ h'^{T}_2(\omega)\ \ldots\ h'^{T}_P(\omega)]^T$ is a vector of length $\underline{M}$, with $\underline{h}'_p(\omega)=[H'^{T}_{p,1}(\omega)\ H'^{T}_{p,2}(\omega)\ \ldots\ H'^{T}_{P,M_p}(\omega)]^T$ being a vector of length $M_p$. The minimum-norm filter can be obtained as:

$$\underline{h}'(\omega)=\underline{\Psi}^H(\omega)[\underline{\Psi}(\omega)\underline{\Psi}^H(\omega)]^{-1}b_{N+1}.$$

The global filter or the beamformer of the CCDMA, as discussed above, can be represented by $\underline{h}(\omega)=[h_1^T(\omega)\ h_2^T(\omega)\ \ldots\ h_P^T(\omega)]^T$, and $h_p(\omega)=[H_1(\omega)\ H_1(\omega)\ \ldots\ H_{M_p}(\omega)]^T$, where $$H'_{p,m}(\omega) = \begin{cases} \frac{1}{2}H_{p,m},\ m = 1 \\ H_{p,m},\ m = 2, \ldots, M_p - 1 \end{cases},$$

$$H'_{p,M_p}(\omega) = \begin{cases} H_{p,M_p}, & (\text{if } M_p \text{ is odd}) \\ \frac{1}{2}H_{p,M_p}, & (\text{if } M_p \text{ is even}) \end{cases}.$$

Thus, a robust CCDMA filter may be achieved when P>1 and $\underline{M}$>N+1. When P=1 and $M_1$>N+1, a robust CDMA beamformer may result. When P=1 and $M_1$=N+1, a regular CDMA beamformer may result.

Figure 3A:
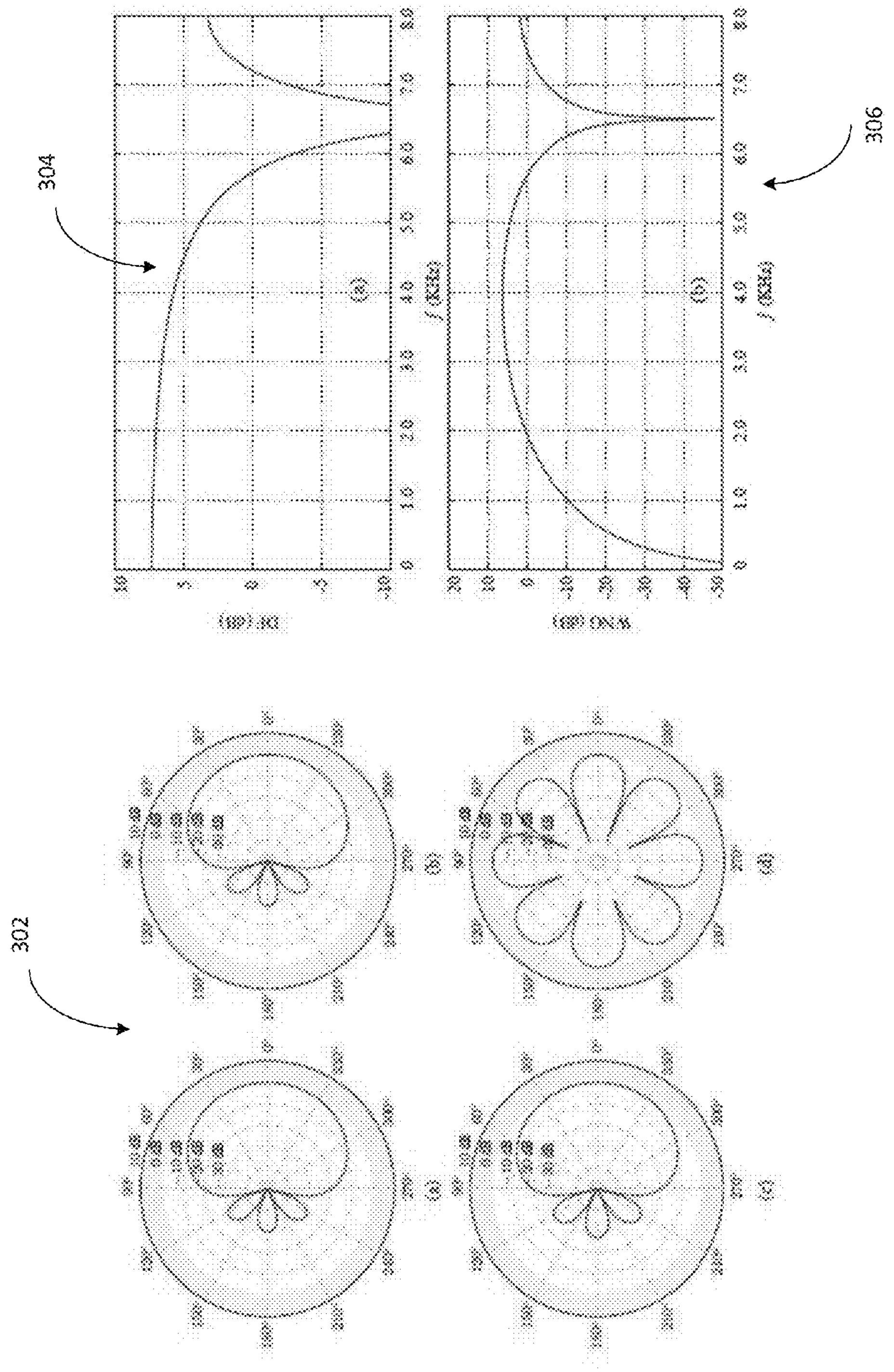
FIG. 3A shows beampatterns, directivity factor (DF), and white noise gain (WGN) associated with a circular differential microphone array (CDMA).
Figure 3B:
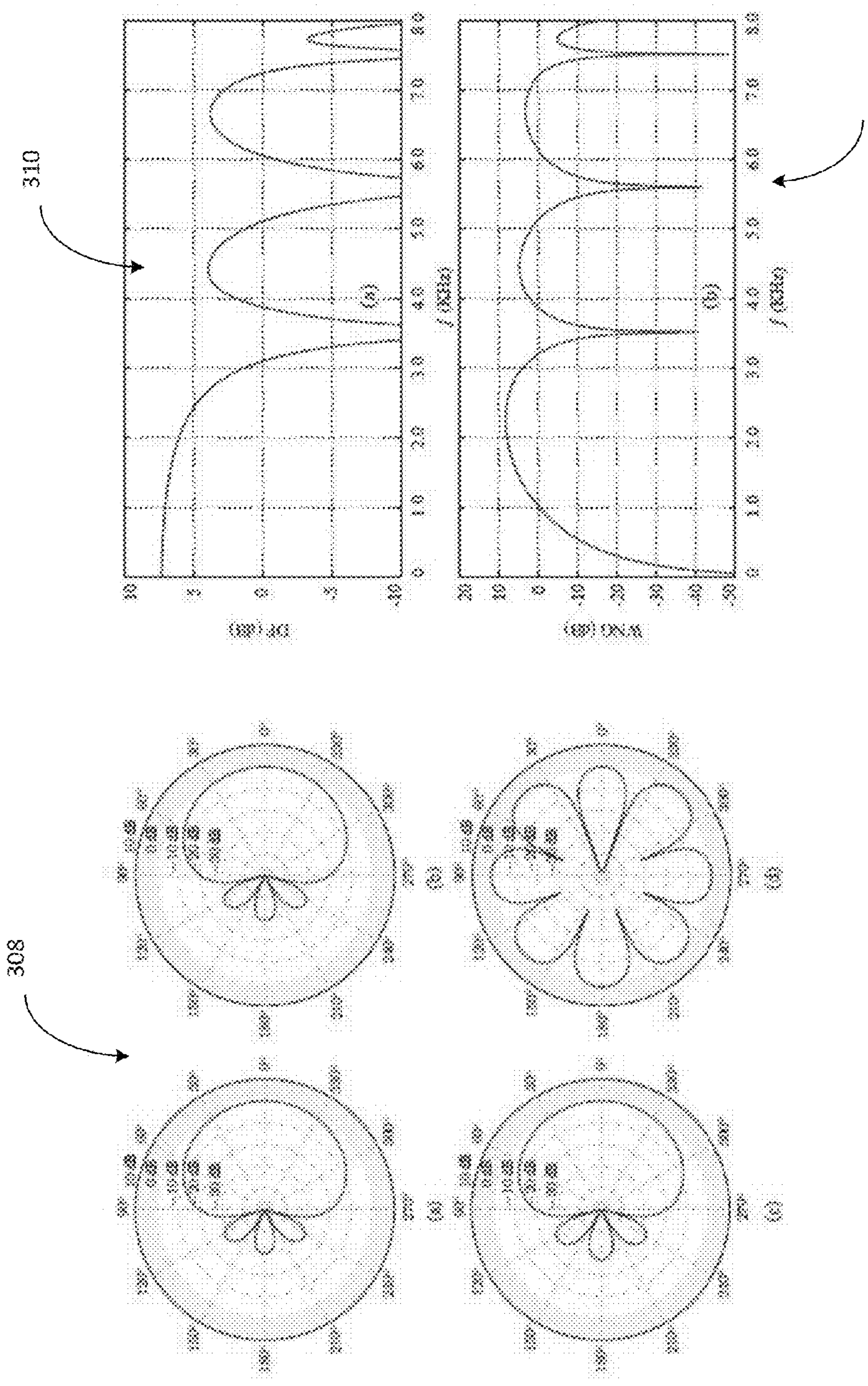
FIG. 3B shows beampatterns 308, directivity factor (DF), and white noise gain (WGN) associated with a robust circular differential microphone array (CDMA).
Figure 3C:
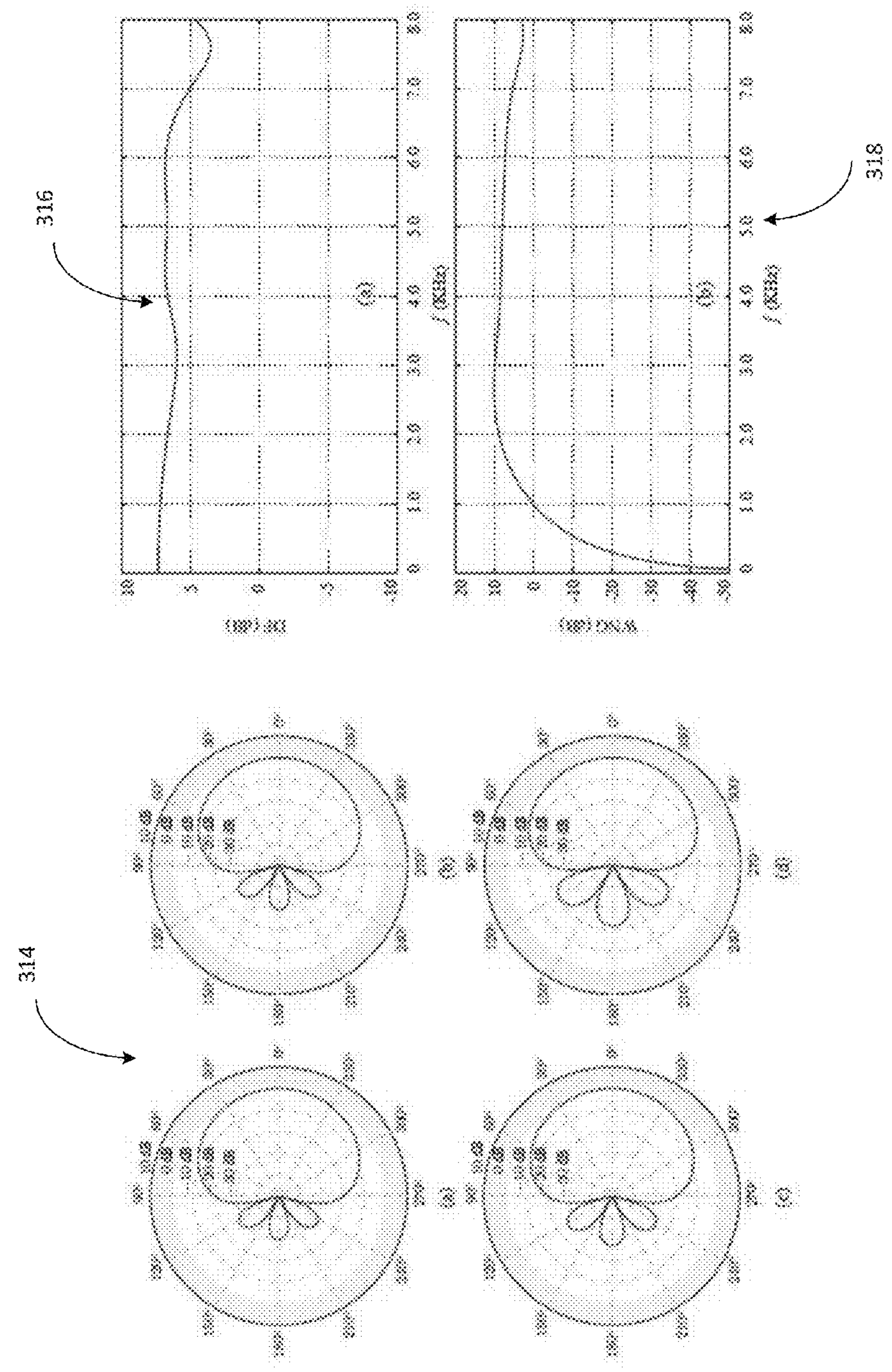
FIG. 3C shows beampatterns, directivity factor (DF), and white noise gain (WGN) associated with a concentric circular differential microphone array (CCDMA) according to an implementation of the present disclosure.

Experiments have shown that robust CCDMA beamformers can perform much better than beamformers for robust CDMA or beamformers for regular CDMA. FIGS. 3A-3C illustrate beampatterns, directivity factors (DFs), and WNGs for regular CDMA, robust CDMA, and CCDMA according to an implementation of the present disclosure. FIG. 3A shows beampatterns 302, directivity factor (DF) 304, and white noise gain (WGN) 306 associated with a circular differential microphone array (CDMA) that employs four (4) microphones along a circle of two (2) centimeter radius (r). The beampatterns 302(*a*)-302(*d*) are at 500 Hz, 1000 Hz, 2000 Hz, and 6500 Hz, respectively. The CDMA has a differential rank (N) of three (3). The beamformer has a null at approximate 6,500 Hz in the frequency domain. As shown in FIG. 3A, the CDMA has almost frequency-invariant beampatterns 302(*a*)-302(*c*) at low frequencies (at f=500 Hz, 1000 Hz, and 2000 Hz), but not at high frequencies (302(*d*), f=6500 Hz). When f=6500 Hz, the beampattern is considerably changed, because of spatial aliasing. FIG. 3A further shows that the beamformer has a very low WNG 306 at low frequencies, indicating that this beamformer may have significantly amplified white noise at low frequencies. As the frequency increases, the WNG improves; however, both the DF and WNG suffer from significant performance degradation near the null's position at approximately f=6500 Hz.

FIG. 3B shows beampatterns 308, directivity factor (DF) 310, and white noise gain (WGN) 314 associated with a robust circular differential microphone array (CDMA) that employs eight (8) microphones along a circle of 3.7 centimeter radius (r). The radius is increased from 2 cm to 3.7 because more microphones are used. The beampatterns 308(*a*)-308(*d*) are at 500 Hz, 1000 Hz, 2000 Hz, and 3520 Hz, respectively. The CDMA has a differential rank (N) of three (3). The beamformer has a null at approximate 3520 Hz in the frequency domain. As shown in FIG. 3B, although the robust CDMA improves the WNG 312 (e.g., at low frequencies) as compared to the regular CDMA (FIG. 3A, 306), the larger radius of the robust CDMA may lead to more nulls in the lower frequency bands (e.g., at f=3520 Hz vs. 6500 Hz) which are the frequency bands of interest.

FIG. 3C shows beampatterns 314, directivity factor (DF) 316, and white noise gain (WGN) 318 associated with a concentric circular differential microphone array (CCDMA) that employs 12 microphones along two circles, whereas eight (8) microphones are located along an outside circle of 3.7 centimeter radius and four (4) microphones are located along an inside circle of two (2) centimeter radius. The beampatterns 314(*a*)-314(*d*) are at 500 Hz, 1000 Hz, 2000 Hz, and 3520 Hz, respectively. The CCDMA has a differential rank (N) of three (3). As shown in FIG. 3C, the beampatterns 314(*a*)-314(*d*) are substantially frequency-invariant through different frequencies (f=500 Hz, 1000 Hz, 2000 Hz, or 3520 Hz). Also, the DF 316 and WNG 318 show that the nulls are mitigated in the frequency bands of interest.

Although implementations of the present disclosure are described in terms of implementations using concentric circular differential microphone arrays (CCDMA), implementations of the present disclosure also include implementations using concentric elliptic differential microphone arrays (CEDMA), where microphones are arranged along concentric ellipses that share a common center and the primary and the second axes.

Figure 4:
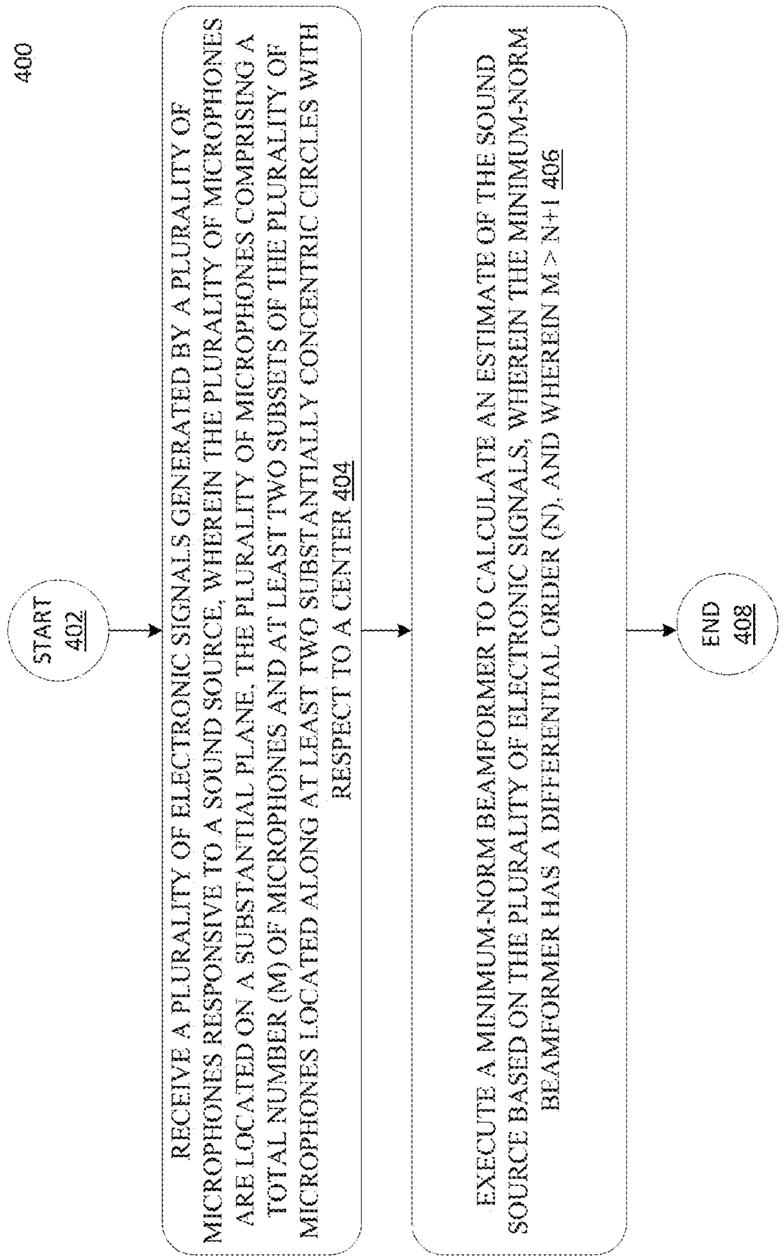
FIG. 4 is a flow diagram illustrating a method to estimate a sound source using a beamformer associated with a concentric circular differential microphone array (CCDMA) according to some implementations of the disclosure.

FIG. 4 is a flow diagram illustrating a method 400 to estimate a sound source using a beamformer associated with a concentric circular differential microphone array (CCDMA) according to some implementations of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one implementation, the methods may be performed by the beamformer 110 executed on the processing device 106 as shown in FIG. 1.

Referring to FIG. 4, at 402, the processing device may start executing operations to calculate an estimate for a sound source such as a speech source. The sound source may emit sound that may be received by a microphone array including multiple concentric rings of microphones that may convert the sound into sound signals. The sound signals may be electronic signals including a first component of the sound and a second component of noise. Because the microphone sensors are commonly located on a planar platform and are separated by spatial distances, the first components of the sound signals may vary due to the temporal delays of the sound arriving at the microphone sensors.

At 404, the processing device may receive the electronic signals from the CCDMA in response to the sound. The microphones in the CCDMA may be located on a substantial plane and include a total number (M) of microphones. The microphones are divided into at least two subsets located along at least two substantially concentric circles with respect to a center.

At 406, the processing device may execute a minimum-norm beamformer to calculate an estimate of the sound source based on the plurality of electronic signals, in which the minimum-norm beamformer has a differential order (N), and M>N+1.

Figure 5:
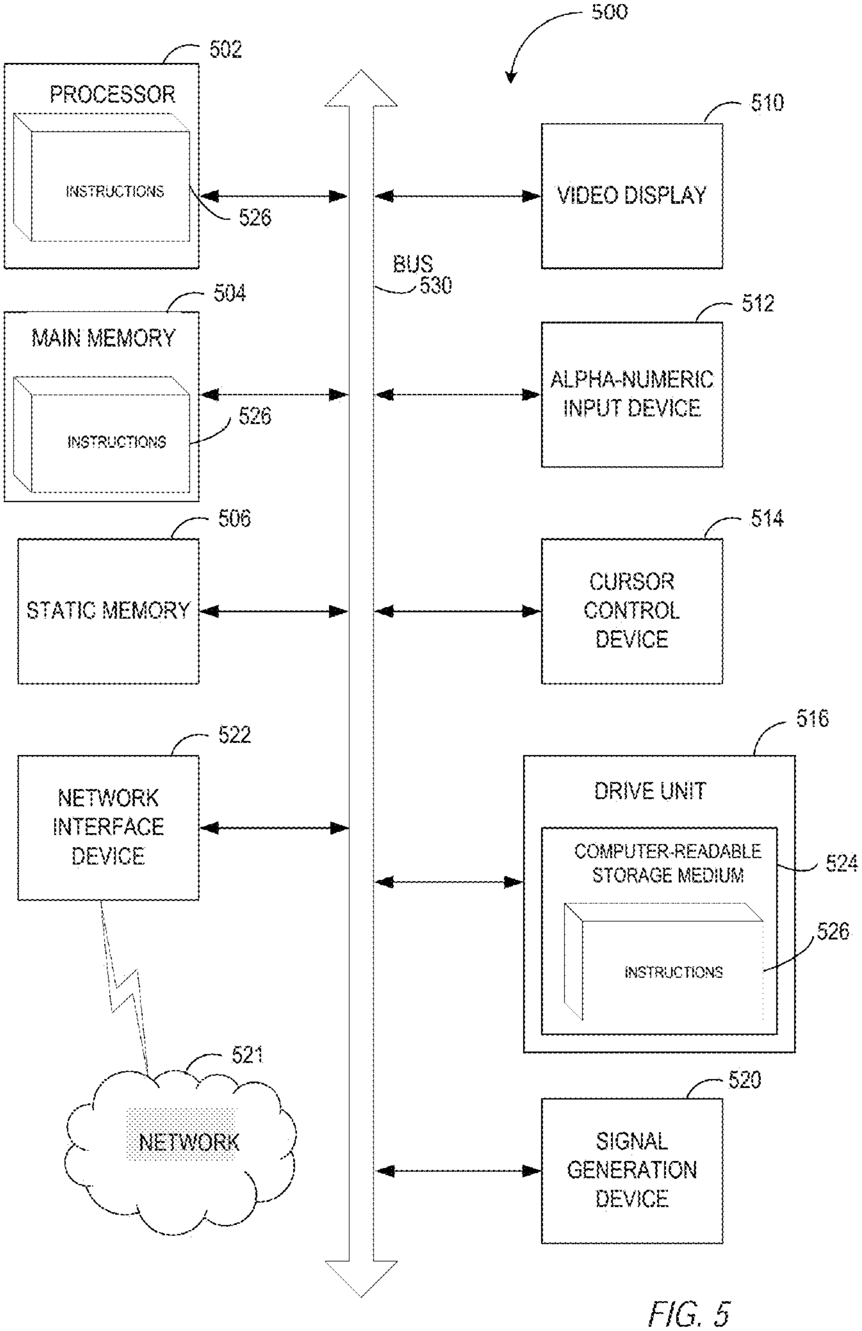
FIG. 5 is a block diagram illustrating an exemplary computer system, according to some implementations of the present disclosure.

FIG. 5 illustrates a diagrammatic representation of a machine in the exemplary form of a computer system 500 within which a set of instructions for causing the machine to perform any one or more of the methodologies discussed herein, may be executed. In alternative implementations, the machine may be connected (e.g., networked) to other machines in a LAN, an intranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD), a cathode ray tube (CRT), or a touch screen), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein (e.g., processing device 102). The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 574 via the network interface device 522.

While the computer-readable storage medium 524 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A differential microphone array comprising:

a plurality of microphones situated on a substantially planar platform, the plurality of microphones comprising:

a total number (M) of microphones; and at least two subsets of microphones of the plurality of microphones situated along at least two substantially concentric ellipses with respect to a center; and a processing device, communicatively coupled to the plurality of microphones, to: receive a plurality of electronic signals generated by the at least two subsets of microphones responsive to a sound source; and execute a minimum-norm beamformer to calculate an estimate of the sound source based on the plurality of electronic signals, wherein a frequency response of the minimum-norm beamformer is substantially free of non-responsive regions caused by nulls, wherein the minimum-norm beamformer has a differential order (N), and wherein M>N+1.

2. The differential microphone array of claim 1, wherein each one of the plurality of electronic signals represents a respective version of the sound source received at a corresponding one of the plurality of microphones.

3. The differential microphone array of claim 1, further comprising:

an analog-to-digital converter, communicatively coupled to the plurality of microphones and the processing device, to convert the plurality of electronic signals into a plurality of digital signals.

4. The differential microphone array of claim 1, wherein each one of the at least two substantially concentric ellipses is a concentric circle, and wherein the plurality of microphones are situated along a number (P) of concentric circles with respect to the center, wherein P is greater than one.

5. The differential microphone array of claim 4, wherein a same number of microphones are situated along each one of the plurality of circles at an equal angular distance.

6. The differential microphone array of claim 4, wherein a number of microphones along a first circle of the concentric circles is different from a number of microphones along a second circle of the concentric circles.

7. A system comprising: a data store; and a processing device, communicatively coupled to the data store, to: receive a plurality of electronic signals generated by at least two subsets of microphones of a plurality of microphones responsive to a sound source, wherein the plurality of microphones are situated on a substantially planar platform, the plurality of microphones comprising a total number (M) of microphones and the at least two subsets of microphones of the plurality of microphones situated along at least two substantially concentric ellipses with respect to a center; and execute a minimum-norm beamformer to calculated an estimate of the sound source based on the plurality of electronic signals, wherein a frequency response of the minimum-norm beamformer is substantially free of non-responsive regions caused by nulls, wherein the minimum-norm beamformer has a differential order (N), and wherein M>N+1.

8. The system of claim 7, wherein each one of the plurality of electronic signals represents a respective version of the sound source received at a corresponding one of the plurality of microphones.

9. The system of claim 7, wherein each one of the at least two substantially concentric ellipses is a concentric circle, and wherein the plurality of microphones are situated along a number (P) of concentric circles with respect to the center, wherein P is greater than one.

10. The system of claim 9, wherein a same number of microphones are situated along each one of the plurality of circles at an equal angular distance.

11. The system of claim 9, wherein a number of microphones along a first circle of the concentric circles is different from a number of microphones along a second circle of the concentric circles.

12. A method comprising:

receiving, by a processing device, a plurality of electronic signals generated by at least two subsets of a plurality of microphones responsive to a sound source, wherein the plurality of microphones are situated on a substantially planar platform, the plurality of microphones comprising a total number (M) of microphones and the at least two subsets of microphones of the plurality of microphones situated along at least two substantially concentric ellipses with respect to a center; and executing a minimum-norm beamformer to calculate an estimate of the sound source based on the plurality of electronic signals, wherein a frequency response of the minimum-norm beamformer is substantially free of non-responsive regions caused by nulls, wherein the minimum-norm beamformer has a differential order (N), and wherein M>N+1.

13. The method of claim 12, wherein each one of the plurality of electronic signals represents a respective version of the sound source received at a corresponding one of the plurality of microphones.

14. The method of claim 13, wherein each one of the at least two substantially concentric ellipses is a concentric circle, and wherein the plurality of microphones are situated along a number (P) of concentric circles with respect to the center, wherein P is greater than one.

15. The method of claim 14, wherein a number of microphones along a first circle of the concentric circles is same as a number of microphones along a second circle of the concentric circles.

16. The method of claim 14, wherein a number of microphones along a first circle of the concentric circles is different from a number of microphones along a second circle of the concentric circles.

17. A non-transitory machine-readable storage medium storing instructions which, when executed, cause a processing device to:

receive, by the processing device, a plurality of electronic signals generated by at least two subsets of microphones of a plurality of microphones responsive to a sound source, wherein the plurality of microphones are situated on a substantially planar platform, the plurality of microphones comprising a total number (M) of microphones and the at least two subsets of microphones of the plurality of microphones situated along at least two substantially concentric ellipses with respect to a center; and execute a minimum-norm beamformer to calculate an estimate of the sound source based on the plurality of electronic signals, wherein a frequency response of the minimum-norm beamformer is substantially free of non-responsive regions cause by nulls, wherein the minimum-norm beamformer has a differential order (N), and wherein M>N+1.

18. The non-transitory machine-readable storage medium of claim 17, wherein each one of the plurality of electronic signals represents a respective version of the sound source received at a corresponding one of the plurality of microphones.

19. The non-transitory machine-readable storage medium of claim 17, wherein each one of the at least two substantially concentric ellipses is a concentric circle, and wherein the plurality of microphones are situated along a number (P) of concentric circles with respect to the center, wherein P is greater than one.

20. The non-transitory machine-readable storage medium of claim 19, wherein a same number of microphones are situated along each one of the plurality of circles at an equal angular distance.

* * * * *